(No Model.)

N. DU BRUL.
CIGAR MOLD.

No. 538,189. Patented Apr. 23, 1895.

Witnesses
Arthur Ashley
Walter Allen

Inventor
Napoleon Du Brul
By Knight Bro.
Attorneys

THE NORRIS PETERS CO., PHOTO-LITHO., WASHINGTON, D. C.

UNITED STATES PATENT OFFICE.

NAPOLEON DU BRUL, OF CINCINNATI, OHIO.

CIGAR-MOLD.

SPECIFICATION forming part of Letters Patent No. 538,189, dated April 23, 1895.

Application filed February 2, 1895. Serial No. 537,118. (No model.)

*To all whom it may concern:*

Be it known that I, NAPOLEON DU BRUL, a citizen of the United States, residing at Cincinnati, in the county of Hamilton and State of Ohio, have invented certain Improvements in Cigar-Molds, of which the following is a specification.

My invention relates to improvements in cigar-molds, in which a series of similarly formed co-operating cups and a series of similarly formed matrices are arranged upon a pair of blocks and my invention consists in certain improvements in the formation of the cups of the mold as will hereinafter be described and particularly claimed.

Figure 1:
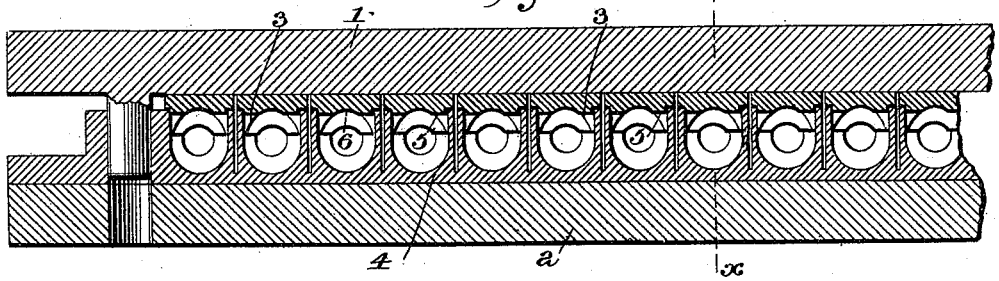
Figure 2:
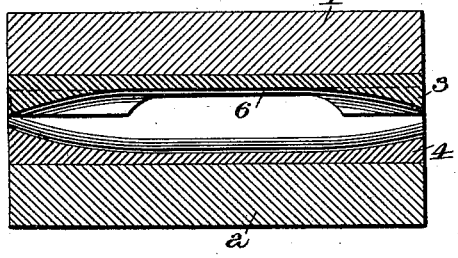
Figure 3:
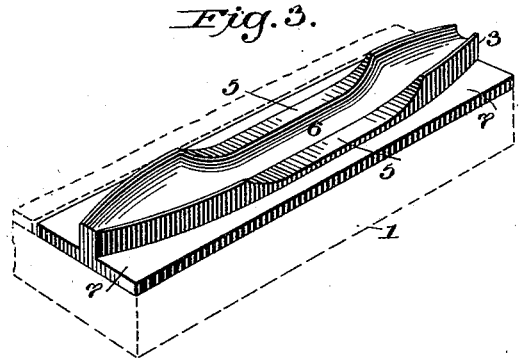
Figure 4:
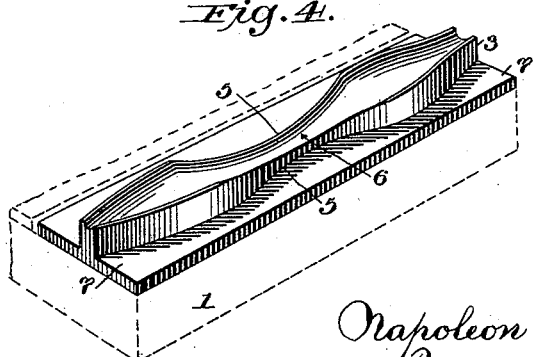

In the accompanying drawings, Figure 1, is a vertical longitudinal section of the cigar-mold constructed in accordance with my invention. Fig. 2 is a vertical, transverse section on the line $x-x$, Fig. 1. Fig 3 is a detail perspective view of my preferred form of cup shown inverted. Fig. 4 is a detail perspective view of a modified form of cup shown inverted.

The object of my invention primarily, is to make the upper cup or cups of the cigar-mold with the part or parts intermediate of the ends largely cut away or reduced in order to allow room for the middle part of the cigar-bunch to expand while it is being shaped in the mold under pressure and to prevent the bunch from receiving as much pressure all around it as it would if that portion of the shaping cup were made complete or semi-circular.

Figs. 1 and 2 represent respectively the upper and lower portions of the mold upon which are mounted the cups 3 and matrices 4 in the usual manner. In constructing the mold according to my present invention the cups are cut away at the sides intermediate of the ends to form recesses as shown at 5 in order to reduce the portion of the cup which will bring pressure upon the cigar-bunch for the purposes stated. As will be seen in Fig. 1 and also in Figs. 2 and 3 the cup is not cut away sufficiently to remove all of the concavity but a portion of this is left as shown at 6, in order to properly confine the bunch in the matrix by pressure from above.

In reducing the middle portion of the cup I may proceed in a number of ways. Two methods are shown respectively in Figs. 3 and 4, of which Fig. 3 is the preferred form. In this form a reduction is made by an inwardly curved vertical cut as shown which removes the wall of the cup down or nearly down to its base 7. In Fig. 4, the reduction is made by the downwardly curved horizontal cut which reduces the height and further the effective extent of this portion of the cup in precisely the same manner as in Fig. 3 and in addition leaves a horizontal portion of the cup at the sides.

Bunches made in the mold constructed as above described are not intended to be left in the mold until perfectly dry but they are preferably removed while yet fresh so that unevenness formed by the cutaway part of the cup can be rolled down by hand in the act of rolling the wrapper on the cigar bunch for such a class of cigars. For such a class of cigars, when the bunch is rolled in a fresh condition the binder of the bunch is often unrolled and re-rolled by hand before the final wrapper is rolled on the bunch.

By removing a portion of the side edges as herein described and shown, it is possible to make a more flexible bunch, and one which will smoke more freely than if pressed all around and made into circular section.

The side edges of the matrix in my preferred form are removed from the face of the matrix but not any lower than the bottom of the shaped cigar cavity. This is preferably retained to regulate the diameter of the bunch and press on the top of the bunch the whole length and width of it. My preferred form makes a stronger cup and leaves a thickness or projection from the flange of the cup to the cutaway part and makes a more practical working cup as it bears down all over the bunch.

The modification as shown by Fig. 4 has the edges cut away from the side.

Having thus described my invention, the following is what I claim as new therein and desire to secure by Letters Patent:

1. A cigar-mold comprising a lower matrix and a co-operating upper cup having the middle portion of its sides cut away so as to leave a portion of the molding face substantially as and for the purpose set forth.

2. A cigar-mold comprising a lower matrix and a co-operating upper cup; said cup having the edges of its sides intermediate of the ends cut away so as to leave a portion of the sides of the cup along the middle thereof and a portion of the molding face substantially as and for the purpose set forth.

3. A cigar-mold having the middle portion of the sides of the upper cup thereof removed by a horizontal cut so as to leave a portion of the concavity substantially as and for the purpose set forth.

4. A cigar-mold having a portion of the sides of its cup intermediate of its ends removed by a curved horizontal cut so as to leave a portion of the molding face substantially as and for the purpose set forth.

NAPOLEON DU BRUL.

Witnesses:
F. H. MURRAY,
J. F. BALDWIN.